United States Patent [19]
Ringer

[11] Patent Number: 5,628,592
[45] Date of Patent: May 13, 1997

[54] TWO-PIECE CONCENTRIC COLLET

[75] Inventor: Cecil D. Ringer, White Rock, S.C.

[73] Assignee: Cooper Industries, Inc., Houston, Tex.

[21] Appl. No.: 521,761

[22] Filed: Aug. 31, 1995

[51] Int. Cl.⁶ .................................................. B23B 45/14
[52] U.S. Cl. ................................................. 408/97; 408/110
[58] Field of Search ...................... 408/79, 80, 81, 408/97, 103, 110, 113, 114; 279/2.04, 2.1

[56] References Cited

U.S. PATENT DOCUMENTS

| | | | |
|---|---|---|---|
| 3,599,958 | 8/1971 | Schindler | 408/79 |
| 3,861,692 | 1/1975 | Patzer | 279/2.04 |
| 5,395,187 | 3/1995 | Slesinski et al. | |
| 5,482,411 | 1/1996 | McGlasson | 408/97 |

FOREIGN PATENT DOCUMENTS

| | | | |
|---|---|---|---|
| 2562179 | 10/1985 | France . | |
| 2103411 | 8/1972 | Germany | 279/2.04 |
| 4009940A1 | 10/1991 | Germany . | |
| 435072 | 11/1974 | U.S.S.R. | 279/2.04 |
| 456686 | 5/1975 | U.S.S.R. | 408/79 |

*Primary Examiner*—Daniel W. Howell
*Attorney, Agent, or Firm*—Burns, Doane, Swecker & Mathis, LLP

[57] ABSTRACT

A drilling mechanism for drilling one or more holes in a workpiece includes a collet for securing the drilling mechanism to a hole formed in a fixture mounted in front of the workpiece. The collet is slidable rearwardly along a tapered nosepiece to be elastically expanded outwardly into tight frictional contact with the fixture hole. The collet comprises a clamping part and a separate displacement part connected thereto. A contact interface is formed by the clamping and displacement parts for transmitting rearward forces from the displacement part to the clamping part. The contact interface extends for 360 degrees about the center axis of the collet. Longitudinal play is provided between the displacement and clamping parts so that when the collet is to be moved forwardly and released from the fixture, the displacement part is initially moved longitudinally relative to the clamping part to apply a radially inward force to the clamping part for disengaging the clamping part from the fixture hole.

23 Claims, 3 Drawing Sheets

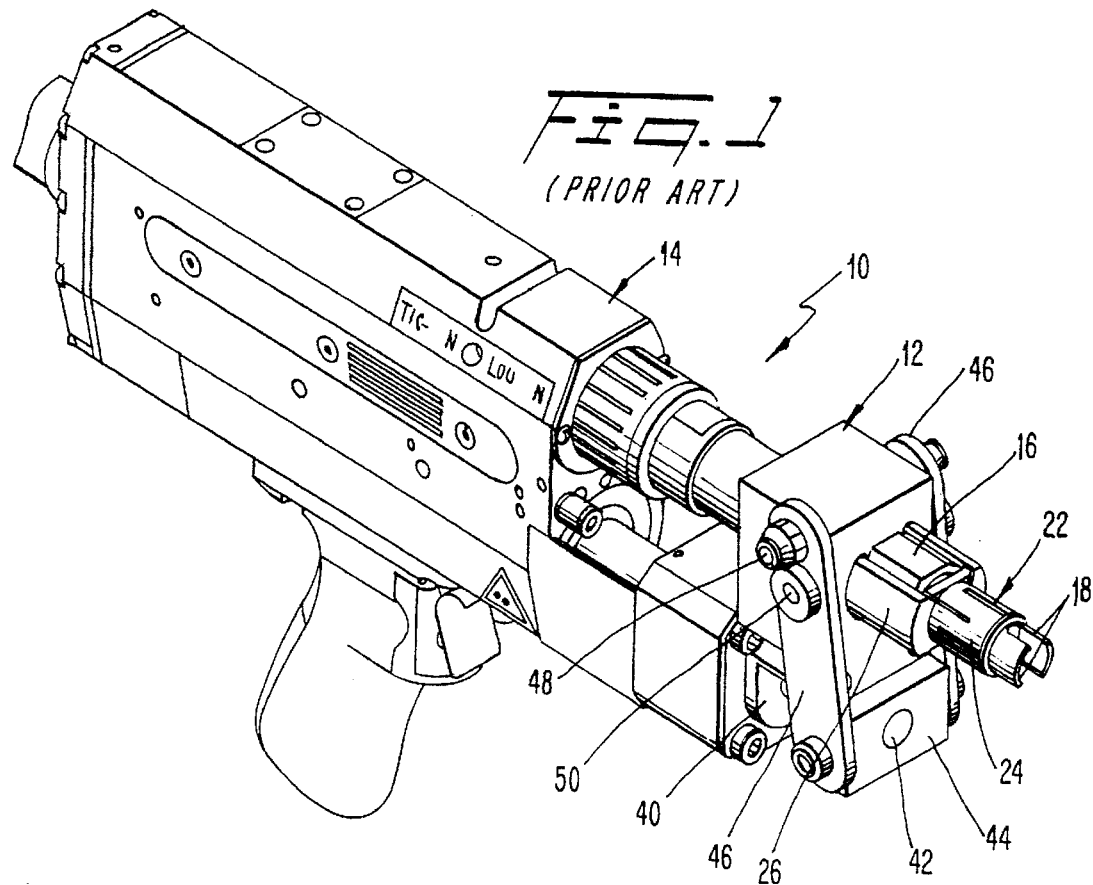
Fig. 1 (PRIOR ART)
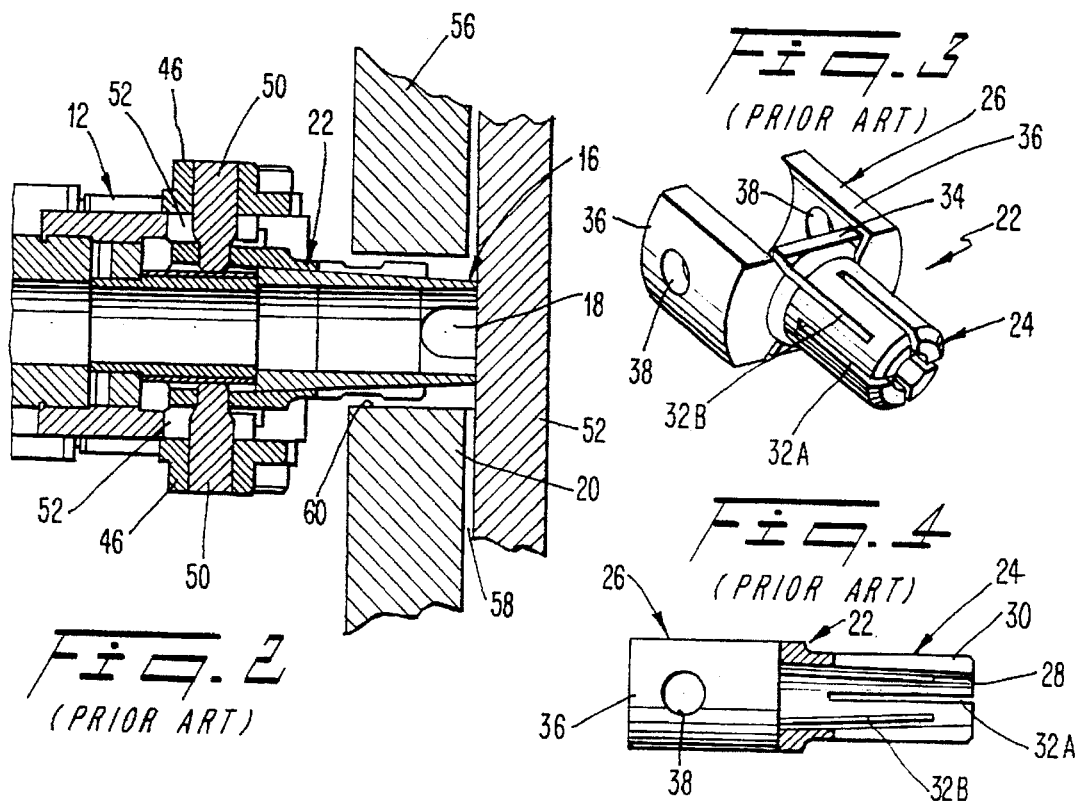
Fig. 2 (PRIOR ART)
Fig. 3 (PRIOR ART)
Fig. 4 (PRIOR ART)

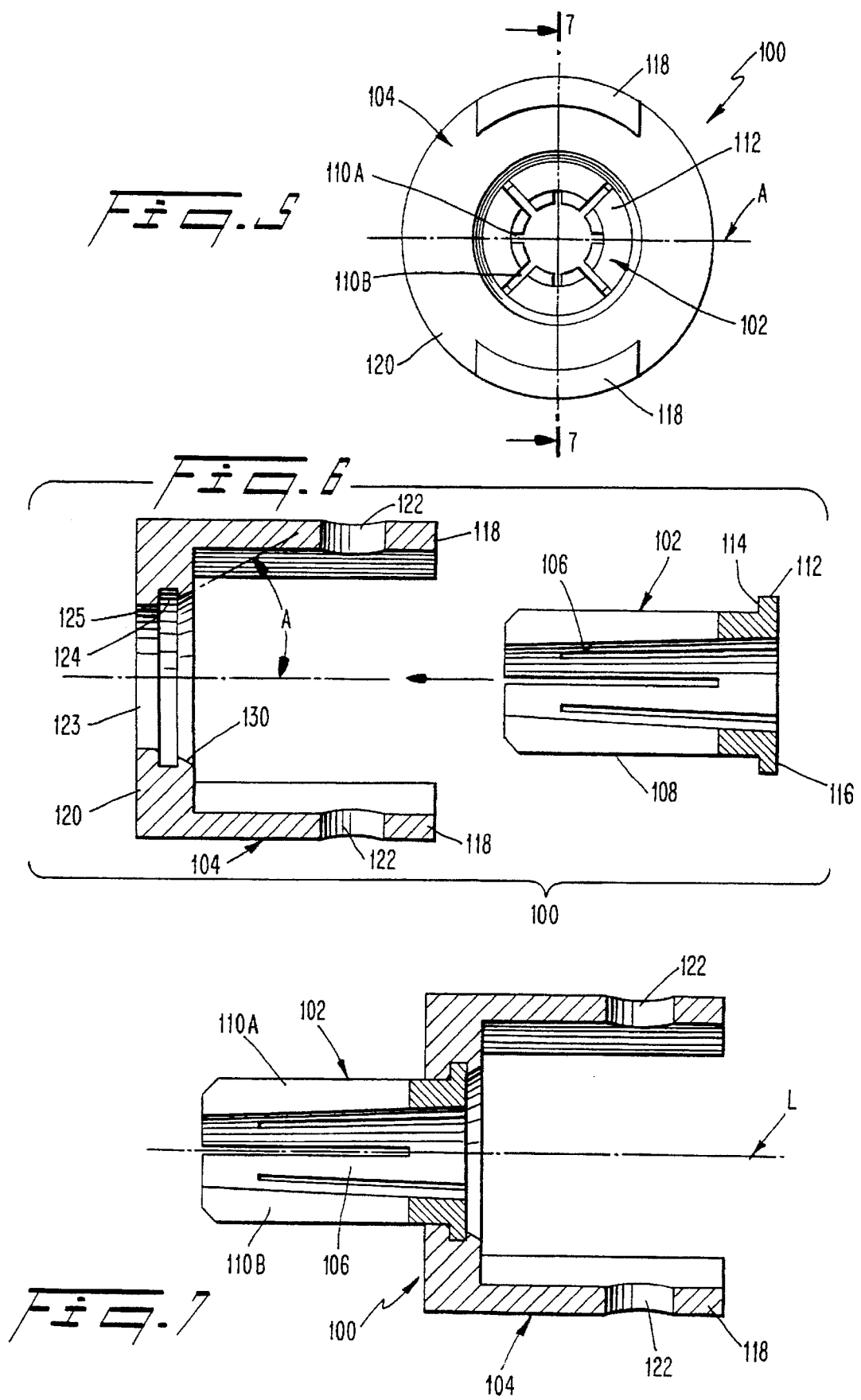

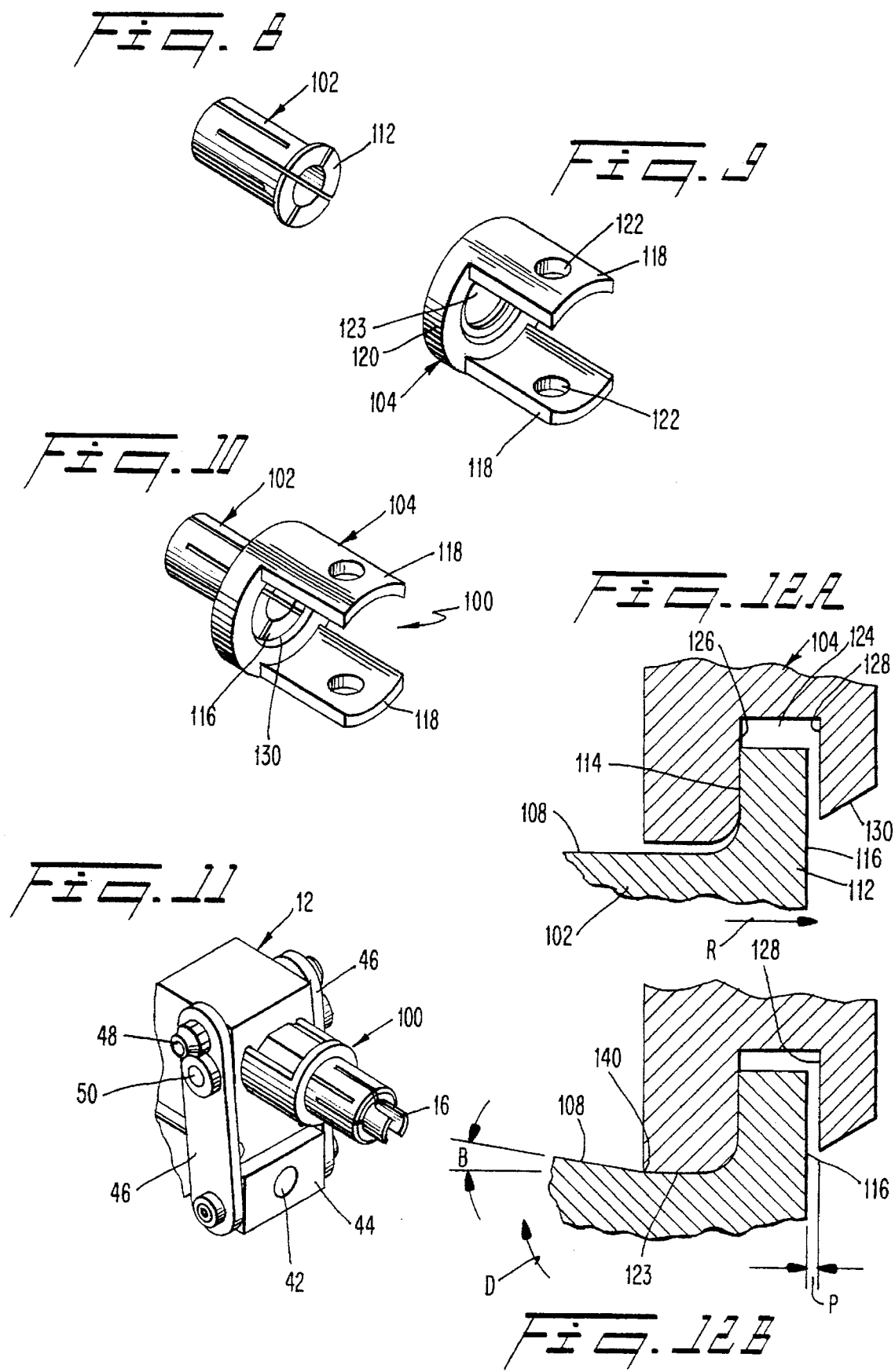

TWO-PIECE CONCENTRIC COLLET

BACKGROUND OF THE INVENTION

The present invention relates to a hole drilling apparatus and, in particular to a collet for securing a drilling mechanism to a fixture which orients the drilling mechanism relative to a workpiece.

The drilling of holes in workpieces such as metal workpieces is usually performed by bringing the workpieces to a drilling machine. It sometimes occurs, however, that the workpiece cannot be conveniently brought to the drilling machine, e.g., the workpiece is too bulky, requiring that the drilling machine be brought to the workpiece. If the holes must be drilled to a higher degree of precision than can be obtained by a manual aligning of the machine, then drilling machines are used which can be clamped to a fixture or template disposed in front of the workpiece.

For example, shown in FIGS. 1 and 2 is a conventional drilling machine 10 manufactured by Cooper Power Tools and designated as a "P2 Drill with Concentric Collet Foot." The machine includes a front clamping unit having a housing 12 secured to the front of a drilling device 14, the device 14 carrying a drill bit (not shown). Projecting forwardly from the housing 12 is a hollow tubular nosepiece 16 that has a pair of recesses 18 formed in a front end thereof for discharging cuttings during a cutting action. An outer peripheral surface 20 of the nosepiece 16 is of slightly conical shape, i.e., it tapers forwardly, forming a small cone angle of 2.5° for example. Slidably disposed on the nosepiece is a collet 22, shown also in FIGS. 3 and 4. The collet comprises a single piece of machined metal forming a tubular front clamping portion 24 and an integral rear displacement portion 26.

The clamping portion 24 is hollow and includes an inner periphery 28 having a forward taper corresponding to that of the outer surface 20 of the nosepiece. The outer periphery 30 of the clamping portion is of cylindrical shape, and longitudinal slits 32A, 32B are formed radially therethrough in circumferentially spaced relationship to enhance the elasticity of the clamping portion. None of the slits extends longitudinally completely through the clamping portion. That is, some of the slits 32A extend rearwardly from the front end of the clamping portion, but terminate short of a rear end thereof, whereas others of the slits 32B extend from the rear end of a bight portion 34 of the displacement portion 26, but terminate short of the front end of the collet.

The yoke-like displacement portion 26 includes a pair of legs 36 extending rearwardly from opposite sides of the bight 34. Those legs 36 are provided with mutually aligned holes 38 for receiving drive pins as will be explained.

When the collet 22, which is slidably mounted on the nosepiece 16, slides rearwardly, the clamping portion 24 is expanded radially outwardly, due to the 2.5° taper. Conversely, when the collet is returned forwardly, the elastic clamping portion springs back to its original relaxed state.

Movement of the collet is effected by a pneumatic cylinder 40 having a piston rod 42 whose free end is affixed to a block 44. The block 44 is pivotably connected to lower ends of parallel links 46 whose upper ends are pivotably connected to opposite ends of a horizontal rod 48. Mounted to each link 46 intermediate the ends of the link is a horizontal drive pin 50 which extends into a respective one of the holes 38 formed in the collet 22. The pins 50 are slidable horizontally in respective horizontal slots 52 formed in the housing.

When it is desired to drill one or more holes in a workpiece 54 such as a metal workpiece (see FIG. 2), a fixture 56 in the form of a template 56 is secured immovably in front of the workpiece in a conventional manner. The fixture is provided with the same hole pattern to be formed in the workpiece. A small space 58 is left between the workpiece and fixture to accommodate the passage of cuttings during the drilling operation.

The nosepiece 16 and collet 22 are inserted through one of the holes 60 of the fixture 56 until the nosepiece contacts the workpiece 52. Then, the pneumatic cylinder 40 is actuated to retract the block 44, thereby causing the links 46 to pivot in a manner displacing the pins 50 rearwardly in the slots 52. The pins 50 pull the collet 22 rearwardly along the tapered outer surface of the nosepiece 16, causing the clamping portion 24 of the collet to be elastically expanded outwardly into tight clamping contact with the wall of the hole 60, thereby securing the drill mechanism 10 against movement with respect to the fixture 56 and thus with respect to the workpiece 52.

Then, the drilling device is actuated to extend a rotating drill bit (not shown) forwardly through the nosepiece 16 to drill a hole in the workpiece. If additional holes are to be drilled, the reverse procedure is followed to enable the collet to be retracted, whereafter the nosepiece and collet are inserted into the next hole of the fixture, and the above-described sequence of steps is repeated.

Among the drawbacks of the above-described apparatus is that the collet may sometimes break prematurely. That is, a clamp force of hundreds of pounds, e.g., 700–800 pounds, is typically applied to the collet, which force is transmitted through the two narrow legs 36 of the collet. Because of the high force and stress concentrations, premature breakage of the legs 36 may occasionally occur.

Furthermore, when it is subsequently attempted to release the collet from the hole 60 by displacing the collet forwardly along the nosepiece, strong resistance is encountered since the collet is tightly wedged between the nosepiece and the wall of the hole by the very slight 2.5° taper of the nosepiece. In fact, the resistance may be so great as to require that a shoulder be placed against the rear of the drilling machine to prevent the drill device 14 from being displaced rearwardly while trying to displace the collet forwardly.

SUMMARY OF THE INVENTION

The present invention relates to a collet which is elastically deformable into clamping arrangement with a wall of a hole in which the collet is disposed. The invention also relates to a drilling machine utilizing such a collet, as well as a clamping unit utilizing such a collet and which is adapted to be mounted on a drilling device.

The collet comprises a rear displacement part and a separate elastically yieldable front clamping part connected to the displaceable part. The clamping and the displaceable parts together form a contact interface extending substantially 360° about a longitudinal center axis of the clamping part for transmitting a rearward force from the displacement part to the clamping part.

Preferably, the displacement part includes a circular groove that opens in a radially inward direction. The clamping part includes a radially outward flange received in the groove. The flange includes front and rear surfaces facing front and rear surfaces, respectively, of the groove. The front surfaces form the contact interface which transmits rearward forces from the displacement part to the clamping part.

The displacement part preferably includes a cam surface which faces radially inwardly and longitudinally rearwardly, the cam surface extending from a radially inner edge of the rear surface of the groove. The cam surface is inclined, in order to cam the flange radially inwardly during assembly of the clamping part to the displacement part. The flange springs radially outwardly into the groove after traveling past the cam surface.

As an independently significant aspect of the collet, there is provided longitudinal play between the clamping and displacement parts, namely between the flange and the front and rear surfaces of the groove. Upon initiating forward movement of the collet, that play enables the displacement part to move longitudinally forwardly relative to the clamping part and apply a radially inward force to the clamping part, thereby facilitating the releasing of the collet.

In another aspect of the invention, the collet can be disposed on a drilling machine which is adapted to be releasably clamped in a hole of a fixture for drilling a hole in a workpiece disposed behind the fixture. The drilling machine comprises a hollow nosepiece having a tapered outer surface, the collet being mounted on that outer surface. A displacement mechanism of the machine is connected to the displacement portion of the collet for displacing the collet rearwardly along the nosepiece such that the clamping portion is elastically expanded outwardly into clamping contact with the wall of the fixture hole. The displacement mechanism is also operable to displace the collet forwardly along the nosepiece to enable the clamping portion to spring back to a rest state.

Yet another significant aspect of the invention involves a clamping unit adapted to be mounted on a drilling device for clamping the drilling device within a hole of the fixture. The clamping unit comprises the hollow nosepiece, the collet mounted on the outer surface of the nosepiece, and the displacement mechanism for displacing the collet along the nosepiece.

BRIEF DESCRIPTION OF THE DRAWING

The objects and advantages of the invention will become apparent from the following detailed description of a preferred embodiment thereof in connection with the accompanying drawings, in which like numerals designate like elements and in which:

FIG. 1 is a top front perspective view of a conventional drilling machine;

FIG. 2 is a horizontal sectional view taken through a front housing of the machine as the machine is preparing to become secured within a hole of a fixture for drilling a hole in a workpiece;

FIG. 3 is a front top perspective view of a conventional collet utilized in the apparatus of FIGS. 1 and 2;

FIG. 4 is a longitudinal sectional view taken through the collet depicted in FIG. 3;

FIG. 5 is a rear end view of a collet according to the present invention;

FIG. 6 is an exploded longitudinal sectional view taken through the collet of FIG. 5;

FIG. 7 is a longitudinal sectional view taken along the line 7—7 in FIG. 5;

FIG. 8 is a rear perspective view of a clamping part of the collet according to the present invention;

FIG. 9 is a rear perspective view of a displacement or yoke part of the collet according to the present invention;

FIG. 10 is a rear perspective view of the collet after the clamping part has been assembled in the displacement part;

FIG. 11 is a top front perspective view of a clamping unit utilizing the collet according to the present invention;

FIG. 12a is an enlarged, fragmentary, longitudinal sectional view of a section of the flange of the clamping part mounted in a groove of the displacement part as the displacement part pulls the clamping part rearwardly to a clamping state; and FIG. 12b is a view similar to FIG. 12a depicting the configuration of the clamping part once it has reached a clamped state.

DETAILED DESCRIPTION OF A PREFERRED EMBODIMENT OF THE INVENTION

A collet 100 according to the present invention is depicted in FIGS. 5–12b. The collet 100 includes a tubular clamping part 102 and a separate yoke-shaped displacement part 104 releasably attached thereto. The parts 102, 104 of the collet 100 can be formed of any suitable material such as a shock resistant, high strength tool steel heat treated to a hardness of Rc 52–56. The clamping part is hollow and includes an inner periphery 106 having a forward taper corresponding to that of the outer surface 20 of the nosepiece 16. The outer periphery 108 of the clamping part is of cylindrical shape, and longitudinal slits 110A, 110B are formed radially therethrough to enhance its elasticity. The slits extend longitudinally, i.e. parallel a longitudinal axis of the collet 100 which coincides with the longitudinal axis of the nosepiece 16 when the collet has been installed thereon. The slits are circumferentially spaced apart. None of the slits extends longitudinally completely through the clamping part 102. That is, some of the slits 110 extend rearwardly from the front end of the clamping part 102, but terminate short of a rear end thereof; others of the slits 110B extend forwardly from the rear end of the clamping part, but terminate short of the front end of the clamping part.

The rear end of the clamping part 102 is formed by a radially outwardly projecting annular flange 112 having front and rear surfaces 114, 116.

The yoke-shaped displacement part 104 includes a pair of legs 118 extending rearwardly from diametrically opposite sides of an annular bight portion 120 of the displacement part 120. Those legs 118 are provided with mutually aligned holes 122 for receiving respective ones of the previously-described drive pins 50 (see FIG. 2).

Formed in the bight portion 120 is an annular through-hole 123 arranged coaxial with the axis L. Disposed in a wall 125 of the hole 123 is an annular groove 124 which opens in a radially inward direction. The groove 124 includes front and rear surfaces 126, 128 (see FIG. 12A). A cam surface 130 which faces radially inwardly and longitudinally rearwardly extends from a radially inner edge of the rear surface 128 and forms an acute angle A relative to the center axis L. The angle A is preferably about 30 degrees, although other angle sizes may be suitable for the intended purpose of the cam surface that will be explained.

To assemble together the clamping and displacement parts 102, 104, the clamping part 102 is pushed longitudinally through the hole 123 of the bight portion 120 of the displacement part 104 as shown in FIGS. 6 and 7. In so doing, the flange 112 engages the cam surface 130 and is elastically displaced radially inwardly. Upon passing the cam surface 130, the flange 112 springs radially outwardly into the groove 124. A slight amount of longitudinal play P is provided between the flange 112 and the groove 124 (see FIG. 12B) for reasons to be explained.

The assembled collet 100 is mounted on the nosepiece 16 of the drilling mechanism 14 shown in FIG. 1, and the drive pins 50 (see FIG. 2) are inserted into respective holes 122 of the collet.

When it is desired to drill one or more holes in the workpiece 54 (see FIG. 2), the nosepiece 16 and collet 100 are inserted through a hole 60 of the fixture 56 until the nosepiece 16 contacts the workpiece 52. Then, the pneumatic cylinder 40 (which could instead be a hydraulic cylinder) is activated to retract the block 44, thereby causing the links 46 to pivot in a manner displacing the drive pins 50 rearwardly in the slots 52. The pins 52 pull the collet 100 rearwardly along the tapered outer surface of the nosepiece 16, causing the clamping part 102 of the collet to be elastically expanded outwardly into tight clamping contact with the wall of the hole 60 to secure the drill mechanism against movement with respect to the fixture 56, and thus with respect to the workpiece 52.

Upon moving the collet 100 rearwardly, the front surface 126 of the groove 124 of the collet 100 engages the front surface 114 of the clamping part 102 to form an annular interface which transfers longitudinal forces from the displacement portion to the clamping portion. Since the interface extends for 360 degrees about the center axis L, the clamp force is distributed over a relatively wide area, thereby minimizing stress concentrations, stress cracks etc. as could occur in the prior art arrangement disclosed in connection with FIGS. 1–3.

Upon being elastically deformed outwardly, the clamping part assumes the state depicted in FIG. 12B, wherein the outer periphery 108 of the clamping part 102 forms an acute angle B with respect to the center axis L.

With the drilling mechanism thus secured to the fixture 56, the conventional drilling device 14 is activated to extend a rotating drill (not shown) forwardly through the nosepiece 16 to drill a hole in the workpiece 52. If additional holes are to be drilled, a reverse procedure is followed to enable the collet 100 to be released from the hole 60, whereafter the nosepiece and collet can be inserted into another hole of the fixture for again performing the above-described sequence of steps.

During release of the collet, the pins 50 are displaced forwardly to cause the rear surface 128 of the displacement part to bear against the rear surface 116 of the flange 112 to form a 360 degree interface therewith. It will be appreciated that as that displacement is occurring, a front corner 140 of the wall 125 of the hole 123 will bear against the outwardly inclined outer peripheral surface 108 of the clamping part 102 and push the clamping part radially inwardly. That radial inward movement aids in releasing the clamping part from the wall 125 of the hole 60. As a result, a much smaller longitudinal force is required to release the collet from its clamped state as compared with the prior art design.

It will be appreciated that the housing 12, including the nosepiece 16, collet 100, pneumatic cylinder 40, and members 44, 46, 50, could be manufactured as a separate clamping unit which can be mounted on a drilling device 14.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. In a drilling machine adapted to be releasably clamped in a hole of a fixture for drilling a hole in a workpiece disposed behind said fixture; the drilling machine comprising a hollow nosepiece having a tapered outer surface; a hollow collet mounted on said outer surface and including a front elastic clamping portion and a rear displacement portion; and a displacement mechanism connected to the displacement portion for displacing the collet rearwardly along the nosepiece such that the clamping portion is elastically expanded outwardly into clamping contact with said wall of said fixture hole, and forwardly along the nosepiece to enable the clamping portion to spring back to a rest state; the improvement wherein said displacement portion and clamping portion constitute separate parts interconnected to one another and together forming a contact interface extending substantially 360 degrees about a longitudinal center axis of said clamping part for transmitting a rearward force from said displacement part to said clamping part.

2. The machine according to claim 1, wherein said contact interface is circular.

3. The machine according to claim 2, wherein said displacement part includes a circular groove that opens in a radially inward direction; said groove including front and rear surfaces, said clamping part including a radially outward flange received in said groove; said flange including front and rear surfaces facing said front and rear surfaces, respectively, of said groove; said front surfaces together forming said contact interface.

4. The machine according to claim 3, wherein said displacement part includes a cam surface facing radially inwardly and longitudinally rearwardly; said cam surface extending from a radially inner edge of said rear surface of said groove; said cam surface being inclined, to cam said flange radially inwardly during assembly of said clamping part to said displacement part; said flange springing radially outwardly into said groove after traveling past said cam surface.

5. The machine according to claim 4, wherein there is provided longitudinal play of said flange in said groove to enable said displacement part to move longitudinally forwardly relative to said clamping part and apply a radially inward force thereto part during initial forward movement of said displacement part.

6. The machine according to claim 1, wherein there is provided longitudinal play between said clamping and displacement parts, enabling said displacement part to move longitudinally forwardly relative to said clamping part and apply a radially inward force to said clamping part during initial forward movement of said displacement part.

7. The machine according to claim 1, wherein said clamping part is generally cylindrical with circumferentially spaced slits extending longitudinally for a portion of said clamping part.

8. The machine according to claim 1, wherein said tapered outer surface forms a cone angle of about 2.5 degrees.

9. The machine according to claim 1, wherein said displacement portion includes a pair of legs extending rearwardly from a bight portion of said displacement portion in which said contact interfaces are formed, each said leg including a hole for receiving a drive pin of said displacement mechanism.

10. In a drilling machine adapted to be releasably clamped in a hole of a fixture for drilling a hole in a workpiece disposed behind said fixture; the drilling machine comprising a hollow nosepiece having a tapered outer surface; a hollow collet mounted on the said outer surface and including a front elastic clamping portion and a rear displacement portion; and a displacement mechanism connected to the displacement portion for displacing the collet rearwardly along the nosepiece such that the clamping portion is elastically expanded outwardly into clamping contact with said wall of said fixture hole, and forwardly along the nosepiece to enable the clamping portion to spring back to a rest state; the improvement wherein said displacement portion and clamping portion constitute separate parts interconnected to one another and together forming front and rear contact interfaces for transmitting rearward and forward forces, respectively, from said displacement part to said clamping part; there being provided longitudinal play between said clamping and displacement parts, enabling said displacement part to move longitudinally forwardly relative to said clamping part and apply a radially inward force thereto during initial forward movement of said displacement part.

11. The machine according to claim 10, wherein said each of said front and rear contact interfaces is circular.

12. The machine according to claim 11, wherein said displacement part includes a circular groove that opens in a radially inward direction; said groove including front and rear surfaces; said clamping part including a radially outward flange received in said groove; said flange including front and rear surfaces facing said front and rear surfaces, respectively, of said groove.

13. The machine according to claim 12, wherein said rear wall includes a cam surface facing radially inwardly and longitudinally rearwardly, said cam surface extending from a radially inner edge of said rear surface of said groove; said cam surface being inclined to cam said flange radially inwardly during assembly of said clamping part to said displacement part; said flange springing radially outwardly into said groove after traveling past said cam surface.

14. A collet adapted to be slidably mounted on a tapered outer surface of a nosepiece for being elastically outwardly expanded into clamping engagement with a wall of a hole in which said collet is disposed; said collet comprising a rear displacement part and a separate elastically yieldable front clamping part connected to said displacement part; said clamping and displacement parts together forming a contact interface extending substantially 360 degrees about a longitudinal center axis of said clamping part for transmitting rearward forces from said displacement part to said clamping part.

15. The collet according to claim 14, wherein said contact interface is circular.

16. The collet according to claim 15, wherein said displacement part includes a circular groove that opens in a radially inward direction; said groove including front and rear surfaces; said clamping part including a radially outward flange received in said groove; said flange including front and rear surfaces facing said front and rear surfaces, respectively, of said groove; said front surfaces together forming said contact interface.

17. The collet according to claim 16, wherein said displacement part includes a cam surface facing radially inwardly and longitudinally rearwardly; said cam surface extending from a radially inner edge of said rear surface of said groove; said cam surface being inclined, to cam said flange radially inwardly during assembly of said clamping part to said displacement part; said flange springing radially outwardly into said groove after traveling past said cam surface.

18. The collet according to claim 14, wherein there is provided longitudinal play between said clamping and displacement parts, enabling said displacement part to move longitudinally forwardly relative to said clamping part and apply a radially inward force thereto during initial forward movement of said displacement part.

19. A collet adapted to be slidably mounted on a tapered outer surface of a nosepiece for being elastically outwardly expanded into clamping engagement with a wall of a hole in which said collet is disposed; said collet comprising a rear displacement part and a separate elastically yieldable front clamping part connected to said displacement part; said clamping and displacement parts together forming contact interfaces for transmitting a rearward and forward forces, respectively, from said displacement part to said clamping part, there being provided longitudinal play between said clamping and displacement parts, enabling said displacement part to move longitudinally forwardly relative to said clamping part and apply a radially inward force to said clamping part during initial forward movement of said displacement part.

20. The collet according to claim 19, wherein said displacement part includes a circular groove that opens in a radially inward direction; said groove including front and rear surfaces; said clamping part including a radially outward flange received in said groove; said flange including front and rear surfaces facing said front and rear surfaces, respectively, of said groove.

21. The collet according to claim 20, wherein said rear wall includes a cam surface facing radially inwardly and longitudinally rearwardly; said cam surface extending from a radially inner edge of said rear surface of said groove; said cam surface being inclined, to cam said flange radially inwardly during assembly of said clamping part to said displacement part; said flange springing radially outwardly into said groove after traveling past said cam surface.

22. A clamping unit adapted to be mounted on a drilling device for clamping the drilling device within a hole of a fixture; said clamping unit comprising a hollow nosepiece having a tapered outer surface, a hollow collet mounted on said outer surface and including a front elastic clamping portion and a rear displacement portion; and a displacement mechanism connected to the displacement portion for displacing the collet rearwardly along the nosepiece such that the clamping portion is elastically expanded outwardly into clamping contact with said wall of said fixture hole, and forwardly along the nosepiece to enable the clamping portion to spring back to a rest state; the improvement wherein said displacement portion and clamping portion constitute separate parts interconnected to one another and together forming a contact interface extending substantially 360 degrees about a longitudinal center axis of said clamping part for transmitting rearward forces from said displacement part to said clamping part.

23. The clamping unit according to claim 22, wherein there is provided longitudinal play between said clamping displacement parts, enabling said displacement part to move longitudinally forwardly relative to said clamping part and apply a radially inward force thereto during initial forward movement of said displacement part.

* * * * *